Jan. 3, 1967  S. M. MARKLAND ET AL  3,296,361
UNIVERSALLY SELF-ADJUSTING FITTING
Filed May 5, 1964
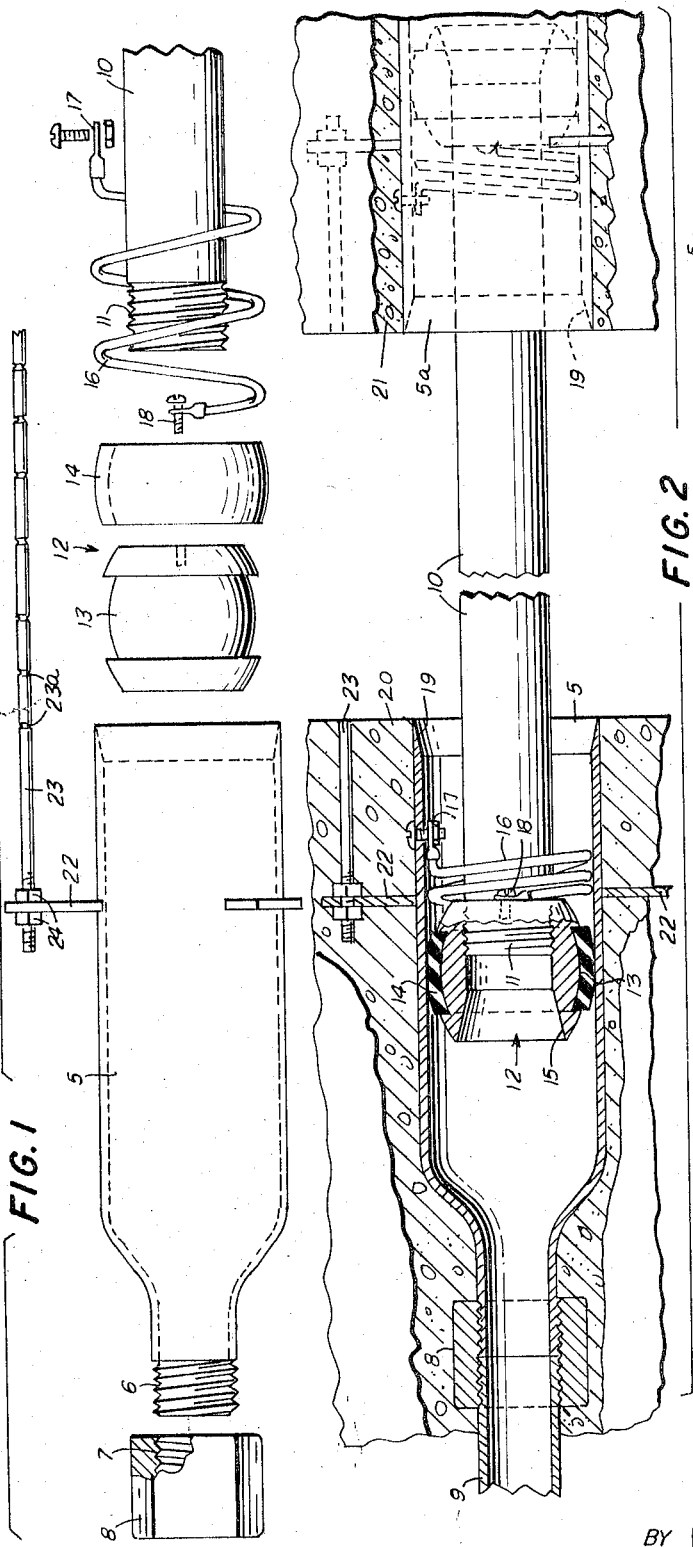
INVENTORS
SAMUEL M. MARKLAND
ORVAL H. LAMPTON
JOE J. URRABAZ
BY Raphael Semmes
ATTORNEY United States Patent Office 3,296,361
Patented Jan. 3, 1967

3,296,361
UNIVERSALLY SELF-ADJUSTING FITTING
Samuel M. Markland, 210 Chesswood Drive, San Antonio, Tex. 78228; Orval H. Lampton, 403 Flora Mae Drive, San Antonio, Tex. 78220; and Joe J. Urrabaz, 172 Dalehurst Drive, San Antonio, Tex. 78201
Filed May 5, 1964, Ser. No. 364,971
8 Claims. (Cl. 174—86)

This invention relates to a universally self-adjusting fitting for use in connection with electrical conduit raceway systems, and consists more particularly in new and useful improvements in a fitting which is capable of self-adjustment for expansion, contraction and lateral deflection.

In the average building structure where the foundations are stable in nature, the installation of race way systems is only required to provide for expansion and contraction in one direction in a common plane. In other words, these systems are set in slabs or decks which undergo relative movement only in one plane. However, if these slabs or decks are not set on stable foundations, such, for example, as in a bridge deck which is cantilevered out and met halfway between its foundations, it is possible for the conduit systems to undergo relative movement not only along their longitudinal axes when they move nearer or farther apart, but also laterally by displacement to the right or left of their longitudinal axes.

It is the primary object of the present invention to provide a fitting designed to contend with practically unlimited expansion and contraction longitudially of the raceway system and to also permit a maximum degree of deflection in lateral directions.

Another object of the invention is to provide a fitting of this nature which can be produced in materials similar to those employed in various known types of electrical conduit raceway systems and can be installed with a minimum of alterations in such systems.

Another object is to provide in an expansion-contraction deflection fitting, means to insure adequate electrical boding so as to create an electrically continuous path through the system.

Still another object of the invention is to provide electrical bonding means for an expansion-contraction-deflection fitting which will automatically facilitate mechanical centering of the fitting components.

With the above and other objects in view which will appear as the description proceeds, the invention consists in the novel features herein set forth, illustrated in the accompanying drawings, and more particularly pointed out in the appended claims.

Referring to the drawings in which numerals of like character designate similar parts throughout the several views;

FIG. 1 is an exploded side elevational view illustrating the individual components embodied in the fitting of the present invention;

FIG. 2 is a longitudinal sectional view of the assembled fitting; and

FIG. 3 is a reduced side elevational view of the assembled fitting, illustrating the lateral deflection feature.

In the drawings, referring first to FIGS. 1 and 2, the components of the fitting in its preferred form comprise two swage nipples 5 and 5a, one for each end of a double connection fitting, the nipples being reduced at one end and externally threaded as at 6 for engagement with the complimentary internal threads 7 of a coupling 8, by means of which the nipples are respectively connected to longitudinally spaced conduits 9 of an electrical raceway. The diameter of the enlarged socket portion or main body of each nipple is predetermined to meet the deflection requirements of the fitting, and, likewise, the outer shell length of sockets or nipples 5, 5a, and proportionally the length of the common floating connection 10, determine the distance of expansion and contraction travel.

The floating, tubular connecting element 10 is of substantially the same diameter as the conduit 9 and is threaded at each end as at 11 for engagement with the internal threads of an annular guide collar or fulcrum head 12 of a diameter to be slidably received within the swage nipples 5, 5a, as seen in FIG. 2. Each guide collar 12 has a substantially ball-shaped outer periphery which is annularly grooved as at 13 to accommodate a sealing gasket 14 of any suitable material, such at Neoprene, which slidably and rotatably engages the inner periphery of the respective swage nipples to prevent the entrance of foreign material into the conduit raceway system. To facilitate the relative movement required between the nipples 5, 5a and the intervening connecting element 10, these gaskets are also preferably rounded, both longitudinally and laterally of their outer peripheries. The free ends of the central longitudinal openings in the guide collars 12 are flared as at 15 to facilitate the installation of tapes and pull-wires, and the eventual installation of conductors which run through the conduits 9.

Each of the nipples 5, 5a are provided with a coiled bonding spring 16, preferably composed of bare, hard-drawn copper wire and provided at one end with a terminal screw and fitting 17 for connection to the inner periphery of the shell of the swage nipple 5 and at the other end with a terminal fitting and screw 18 for connection to the end rim of the adjacent guide collar 12. When installed, the bonding springs 16 are pressure-connected or compressed between the points of connection to the respective swage nipples and guide collars at opposite ends of the fitting, so that in addition to providing an electrical bond, the springs tend to mechanically center the floating connection 10 and its opposite guide collars with respect to the swage nipples. Thus, each swage nipple is bonded electrically to the conduit system 9 by its threaded coupling 8; the collars 12 are electrically bonded to respective swage nipples by the coiled copper springs 16; and floating connection 10 is electrically bonded to the guide collars 12 by the threaded connections 11 so as to create an electrically continuous path throughout the system.

To facilitate the insertion of the ends of the floating connection 10 within the respective swage nipples, the open ends of the latter are preferably flared as at 19 so as to provide diverging throats.

In order to maintain the components of the fitting in proper alignment during installation in concrete slabs or decks 20 and 21, for example, located in longitudinally spaced positions, the outer periphery of each of the swage nipples 5, 5a is provided with radially disposed fins or ears 22 which may be welded or otherwise secured to the nipples. These ears are transversely apertured to receive the threaded ends of serrated dowels 23 which are locked in place by suitable lock nuts 24. Inasmuch as these dowels are employed only during the installation process and are removed after the concrete of slabs 20 and 21 has been poured, the serrations 23a in the dowels are provided to facilitate the breaking of the dowels so that they may be removed. It may also be noted that the dowel arrangement also enables the adjustment and spacing of the swage nipples to the exact width between the opposed slabs or decks 20, 21.

In the assembly of this improved fitting, the guide collars 12 are first screwed onto the opposite threaded ends 11 of the floating connection 10, the gaskets 14 having been slipped over the guide collars and located in their respective grooves 13. The terminal fittings 18 of springs 16 are then connected to the respective collars 12 and the ends of the floating connection 10 carrying the guide collars are inserted a predetermined distance within the open ends of the swage nipples 5 and 5a. The bonding springs 16 are then compressed and their opposite terminal screw fittings 17 are connected to the shells of the respective swage nipples, all as shown in FIG. 2. The swage nipples are then connected to conduits 9 and properly aligned for the pouring of the concrete slabs 20 and 21 and are adjusted and maintained in this aligned position by means of the serrated dowels 23, which, as before stated, are removed after the concrete has been poured and set.

In some instances, it may be necessary to install the fitting of this invention between conduit sections which have already been securely fastened in place by some means, and, as all conduit threads are cut in the same direction with right-hand threads, this would present a problem if the installation of an assembled fitting were undertaken. In such instances, this fitting can be installed by first removing the serrated dowels 23 and then releasing one of the terminal screws 17 that connects the spring 16 to the swage nipple 5. This allows the swage nipples to rotate independently so that they can be screwed onto their respective conduit ends 9. After this is accomplished, the fitting can be re-assembled in its proper place between the conduit sections.

It will be apparent that this fitting not only permits expansion and contraction along its longitudinal axis, due to the sliding relation of the guide collars 12 and their respective swage nipples, but also permits lateral or rotary deflection of one swage nipple and its connected conduits with respect to the other, as shown by the arrows in FIG. 3. Furthermore, the design of this fitting permits a maximum of self-adjustment or flexing without injury to the insulation of electrical cables extending through the fitting.

While the invention has been described as comprising two swage nipples, it will be understood that under certain conditions one swage nipple and its component parts could be effectively used in an electrical conduit system. However, the fitting embodying the two swage nipples and components is the preferred form of the invention for the purpose of an expansion-contraction-deflection joint to compensate for any relative movements between conduit sections which may be caused by varying temperatures and climatic conditions.

While the preferred form of the invention embodies a coiled bonding spring 16 serving the dual purpose of a centering spring and an electrical bonding element, there may be some instances where the centering feature is not required. In this event, any suitable electrical bonding connection between the swage nipples and the guide collars may replace the coiled springs 16.

From the foregoing, it is believed that the invention may be readily understood by those skilled in the art without further description, it being borne in mind that numerous changes may be made in the details disclosed without departing from the spirit of the invention as set forth in the following claims.

We claim:

1. A fitting for connecting two longitudinally spaced metallic conduits of an electrical raceway system, comprising two universally self-adjusting joints, each including a metallic outer member having means at one end for connection to one of said conduits, its opposite end terminating in an elongated, open, radially enlarged cylindrical socket, a common tubular metallic inner member of substantially less diameter than that of said sockets, opposite ends of said inner member being telescopically inserted in respective sockets, said inserted ends being radially bounded by substantially ball-shaped fulcrum heads extending between said inner member and the inner walls of respective sockets, peripheral seals on said heads in longitudinal and rotary sliding relation to respective sockets, whereby said inner member is relatively adjustable with respect to said outer members, both longitudinally and universally, and means electrically bonding said outer members to said common inner member to provide an electrically continuous path through the raceway system.

2. A fitting as claimed in claim 1, wherein the fulcrum head is metal and said means for electrically bonding said outer members to said inner member comprise resilient metallic springs, and means for electrically connecting the same under tension between the respective sockets and fulcrum heads to thereby provide an electrical bond and an automatic mechanical centering means for said inner tubular member with respect to said sockets.

3. A fitting as claimed in claim 2, wherein said metallic springs are formed of coiled, electrically conducting wire and are respectively connected at their opposite extremities to said sockets and heads under compression.

4. A fitting as claimed in claim 2, wherein said metallic springs are formed of coiled, bare, hard-drawn copper wire and are respectively connected at their opposite extremities to said sockets and heads under compression.

5. A fitting for connecting two longitudinally spaced metallic conduits of an electrical raceway system, comprising two universally self-adjusting joints, each including a metallic outer member having means at one end for connection to one of said conduits, its opposite end terminating in an elongated, open, radially enlarged cylindrical socket, a common tubular metallic inner member of substantially less diameter than that of said sockets, opposite ends of said inner member being telescopically inserted in respective sockets, said inserted ends being radially bounded by substantially ball-shaped fulcrum heads extending between said inner member and the inner walls of respective sockets, peripheral seals on said heads in longitudinal and rotary sliding relation to respective sockets, whereby said inner member is relatively adjustable with respect to said outer members, both longitudinally and universally, means electrically bonding said outer members to said common inner member to provide an electrically continuous path through the raceway system, and means for maintaining the socket ends of opposed outer members in longitudinal alignment during installation.

6. A fitting as claimed in claim 5, wherein said last-named means comprise annularly spaced, radially projecting brackets fixed to the outer peripheries of said outer members, and dowel means adjustably connected between opposed brackets of respective outer members.

7. A fitting as claimed in claim 6, wherein said dowel means are formed of metal and are respectively provided with a series of longitudinally spaced peripheral serrations to facilitate removal after the fitting has been assembled and installed.

8. A fitting for connecting two longitudinally spaced metallic conduits of an electrical raceway system, comprising two universally self-adjusting joints, each including a metallic outer member having means at one end for connection to one of said conduits, its opposite end terminating in an elongated, open, radially enlarged socket member, a common tubular metallic inner member of substantially less diameter than that of said sockets, opposite ends of said inner member being telescopically inserted in respective sockets, substantially ball-shaped fulcrum heads radially bounding said inserted ends and extending between said inner member and the inner walls of respective sockets, said fulcrum heads having passageways forming continuations of the interior of said inner member, said passageways terminating at opposite ends of said inner member in flaring mouths to facilitate the installation of tapes, pull-wires, and conductors running from one of said spaced conduits to the other, peripheral seals on said heads in longitudinal and rotary sliding relation to respective sockets, whereby said inner member is relatively adjustable with respect to said outer members, both longitudinally and universally, and means electrically bonding said outer members to said common inner member to provide an electrically continuous path through the raceway system.

References Cited by the Examiner

UNITED STATES PATENTS

| | | | |
|---|---|---|---|
| 2,845,283 | 7/1958 | Kuhn | 285—302 X |
| 2,900,436 | 8/1959 | Appleton | 174—86 |
| 2,913,987 | 11/1959 | Clymer | 174—86 X |

FOREIGN PATENTS 471,657   2/1951   Canada.

OTHER REFERENCES

"Expansion Fittings," advertisement of the Spring City Electrical Manufacturing Company, published in Electrical Construction and Maintenance, mid-September 1959, p. 167.

LEWIS H. MYERS, *Primary Examiner*.

DARRELL L. CLAY, *Examiner*.